Figure 1:
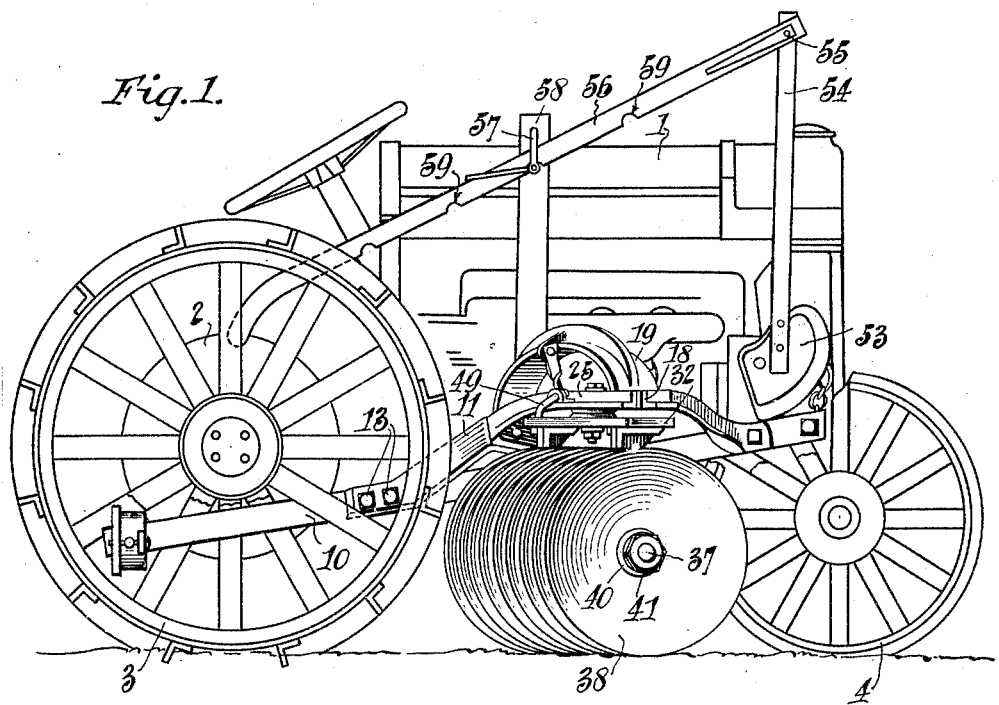

Oct. 15, 1929.  L. C. HESTER  1,731,925
AGRICULTURAL MACHINE
Filed May 25, 1927   2 Sheets-Sheet 1

WITNESSES
Chas. J. Diller
John E. Baaups

INVENTOR
L. C. Hester
BY Munn & Co.
ATTORNEYS

Oct. 15, 1929.  L. C. HESTER  1,731,925
AGRICULTURAL MACHINE
Filed May 25, 1927   2 Sheets-Sheet 2
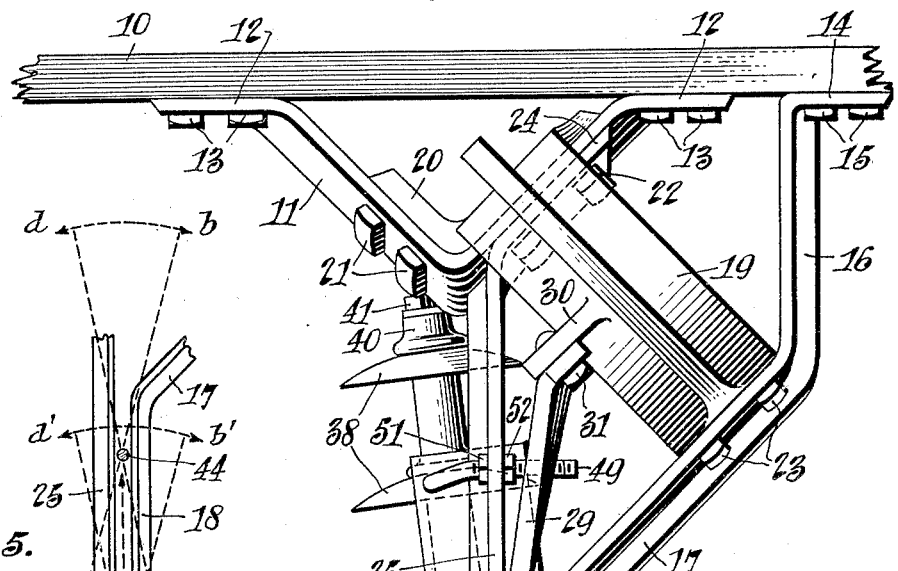
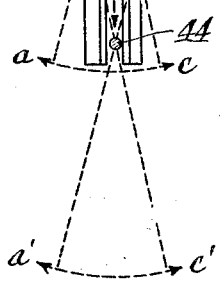
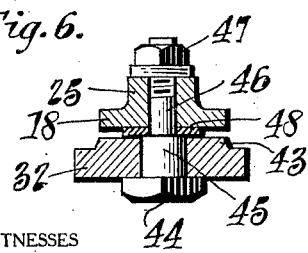
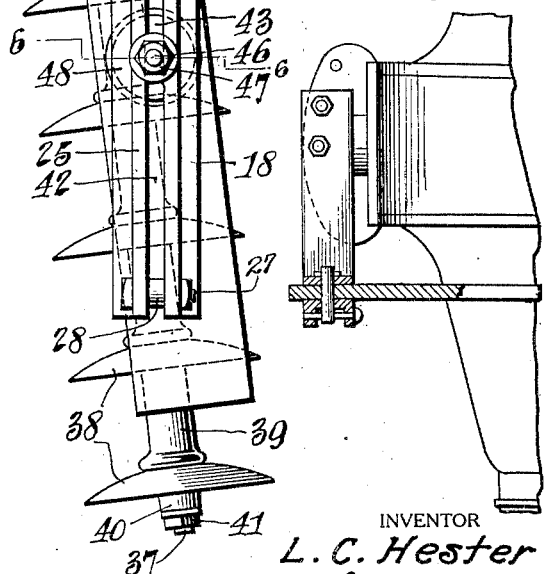

Patented Oct. 15, 1929

1,731,925

UNITED STATES PATENT OFFICE

LEVI CUMMINGS HESTER, OF JACKSONVILLE, FLORIDA

AGRICULTURAL MACHINE

Application filed May 25, 1927. Serial No. 194,101.

This invention relates to improvements in agricultural machines generally, and more particularly to a type of such machines employed in conditioning and preparing the soil for cultivation purposes.

Heretofore, in the cultivation of orange groves, orchards and the like, and after the trees, bushes, plants, etc. have obtained a fair amount of growth, it has been practically impossible to properly condition or cultivate the soil around and under the low boughs or limbs thereof by the use of machine or other types of cultivators or harrows, and the high cost of labor has made the use of hand implements prohibitive. This is particularly true in the cultivation of extensive grove and orchard operations, and a proper preparation and conditioning of the soil is absolutely necessary for the commercial success of such operations.

It is, therefore, the principal object of the present invention to provide for a harrow construction which is adapted for efficient operation in cultivating the soil beneath the low hanging boughs or limbs of trees and the like and close in to the base of the trunk or main stems thereof, with a minimum chance of damage to the boughs or limbs, as well as for use in the manner of other types of cultivators and harrows in ordinary farm operations.

Another object of the invention is to provide for a cultivator or harrow as hereinbefore characterized, and which is especially adapted for use with an attachment to known types of farm tractors, and more particularly a Fordson tractor.

A further object of the invention is to provide for a cultivator or harrow construction embodying a novel and useful means for effecting the attachment of the same to a tractor, and to admit of the adjustable extension of the cultivator or harrow sideways from the tractor, whereby to permit of the efficient operation of the same at a distance from the latter, and of its passage beneath the boughs or limbs of trees and the like.

A still further and equally important object of the invention is to provide for a cultivator or harrow attachment as aforesaid, and one which, in addition to being extended outwardly from a tractor for the purposes stated, is also capable of being reversed, whereby the soil may be forced in directions either toward or away from the tractor, such admissibility of changing or reversing of direction of throw of the soil being extremely valuable in the operation of certain types of cultivators or harrows, and particularly when cultivating at the greater distances beneath the boughs or limbs of trees and the like.

Figure 2:
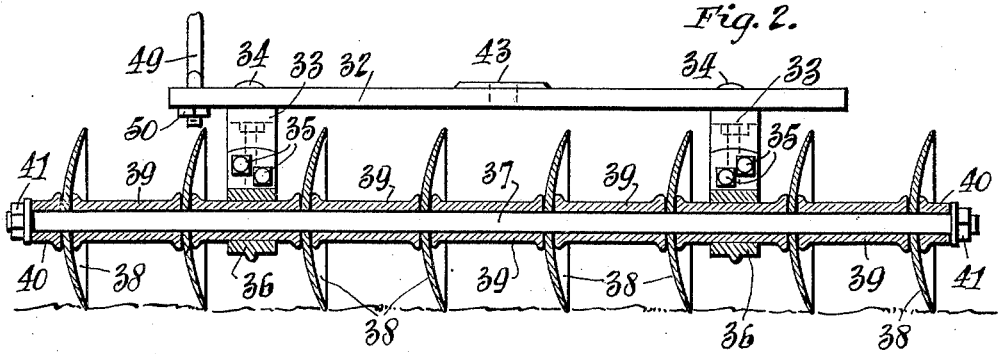
Figure 3:
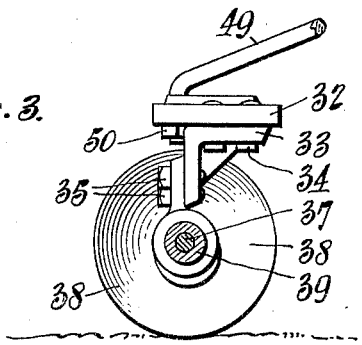

With the foregoing and other objects, advantages and purposes in view, the invention resides in the certain new and useful combination, construction and arrangement of parts as will be hereinafter more fully described, set forth in the appended claims, and illustrated in the accompanying drawings, in which:

Figure 1 is a side elevation of a Fordson tractor showing a practical application of the invention thereto, Figure 2 is a vertical longitudinal section through the cultivator or harrow structure per se, Figure 3 is a vertical transverse section taken on the line 3—3 of Figure 2, Figure 4 is a top plan view of the cultivator or harrow and its attaching frame, Figure 5 is a fragmentary plan view of the outer end portion of the attaching frame showing diagrammatically the adjustable extension and reversed positions of operation of the cultivator or harrow, and Figure 6 is a vertical transverse section through the outer end portion of the cultivator or harrow supporting frame and the adjustable connecting means therebetween, the same being taken on the line 6—6 of Figure 4.

Figure 7 is a detail of the connection of the rear end of the frame bar to the draw bar of the tractor.

Referring to the drawings, wherein similar characters of reference designate corresponding parts throughout the several views thereof, 10 designates a supporting member or bar to be positioned at one side of the tractor 1, and, as shown, the same has one end passed rearwardly beneath the rear driving axle housing 2, and from which it is suspended in a manner suitable for permitting the forward end thereof to be raised and lowered as occasion may require, as will be hereinafter fully explained.

Attached to the outer side face of the member or bar 10 is a substantially V-shaped frame member 11 having outwardly disposed angular extending portions 12 at its free ends arranged in abutting relation thereto and fastened by means of the bolts or lag screws 13. This frame member or hanger 11 is positioned on the supporting bar 10 so as to project outwardly therefrom between the rear driving wheel 3 and from the front wheel 4, of the tractor 1, and in a manner to clear the same for all operative purposes.

Secured to the supporting member 10 forwardly of the frame member 11 is a second frame member having an end portion 14 angularly bent for abutting contact with the outer side face of the member 10, and apertured for the engagement therewith of fastening bolts or lag screws 15. An intermediate portion 16 of this second frame member extends outwardly from the connected portion 14 in substantially right angular relation with respect thereto, and merges at its outer end into a rearwardly and outwardly bent intermediate portion 17, which, in turn, at its outer end merges into an outer end portion 18 disposed in a plane substantially at right angles to the adjacent side of the tractor and parallel to the inner connected portion 16. In its secured relation with respect to the frame member 11, the rearwardly and outwardly directed intermediate portion 17, of the second frame member, lies in a plane substantially parallel to the forward connected angular portion of the member 11, this latter portion of the member 11 and the portion 17 of the second frame member being connected together, in a suitably spaced relation, by means of an upwardly arched member 19. The inner end of the arched connecting frame member 19 is formed to provide a substantially V-shaped attaching portion 20, which is fitted into the outer apex end of the frame member 11, and is secured to the latter by means of oppositely disposed pairs of bolts or the like 21 and 22, while the other or outer end of this member 19 is secured directly to the intermediate portion 17 of the second or outer frame member, by means or bolts or the like 23. Secured at its inner end portion 24 to the forwardly disposed leg of the frame member 11, by means of the aforesaid bolts or fastenings 22, is an intermediate frame member 25, which extends outwardly from its connected end 24 in a plane substantially parallel to the outer straight end portion 18 of the second or outer frame member. The outer parallel portions of the members 18 and 25 are secured in a desired spaced and parallel relation by means of inner and outer bolts 26 and 27 respectively, the bolt 27 having a spacing collar 28 on the same interposed between the opposed members 18 and 25, while the bolt 26 has its intermediate portion engaged by the outer end of a brace member or bar 29, which extends inwardly and upwardly and connects at its other end to a lug 30 carried medially from the rearwardly disposed edge portion of the arched frame member 19, which end is secured to the lug 30 by means of a bolt 31.

Adapted for attachment to the supporting draft frame as thus constructed and mounted on the tractor 1, is a harrow unit which comprises an elongated draft bar 32 having angular bearing brackets 33 depending in spaced relation from its under side and secured in position thereon by means of bolts or the like 34. Secured to the depending portions of the brackets 33 by means of bolts or the like 35 are bearings 36 in which is journaled an axle 37. Mounted on the axle 37 are a plurality of harrow discs 38, which are equidistantly spaced apart by means of spacing sleeves 39. This disc and spacing sleeve assembly are secured in position on the axle 37 by means of oppositely and outwardly disposed clamping collars 40, which are forced inwardly of the opposite ends of the axle 37 and against the adjacent of the discs 38 by means of retaining nuts 41 threaded onto the ends of the axle for the purpose. It is to be noted that the axle 37 may not be directly journaled in the bearings 36, but that the complemental of the spacing sleeves 39, on the axle 37, can be so journaled and take the usual wear from the axle, and, when unduly worn, these sleeves can be readily replaced.

This harrow unit is to be positioned beneath the outwardly extended portion of the supporting draft frame when operative, and is to be adjusted longitudinally of these frame portions throughout the length of the slotway 42 formed therebetween, the length of the said slotway 42, and, consequently, of the distance of adjustment of the harrow, being determined by the spaced position of the bolts 26 and 27. To permit of reversed angular adjustments of the harrow with respect to its possible parallel relation with respect to the frame portions 18 and 25, the upper face of the draft bar 32 is formed to provide a boss 43 surrounding an opening through the center of the draft bar, and passed upwardly of this opening is a pivot member 44, which is formed with an enlarged cylindrical portion 45 fitting the opening in the draft bar 32 and an upper reduced cylindrical portion 46 projected upwardly through the slotway 42. The free end of this portion 46, of the pivot 44, is preferably threaded to receive thereon a securing nut 47. A washer or the like 48 is interposed between the face of the boss 43 and the under sides of the frame portions 18 and 25. To effect an accurate and positive angular adjustment of the harrow with respect to the frame portions 18 and 25, an angularly and upwardly bent member or rod 49 is secured, as at 50, at its lower end to the inner end of the draft bar 32, of the harrow, and has its upper end portion extending horizontally in a forward direction and passing through one of a longitudinal series of openings formed in the intermediate frame member 25. This engaged end of the rod 49 is threaded, and has thereon a nut 51 disposed at one side of the frame member 25 and a second nut 52 at the other side of the latter.

To effect a raising and lowering of the supporting frame and harrow, so that, in the travel of the tractor 1 to and from a soil conditioning operation, the discs 38 will be retained either in position above the ground surface or in substantially free rolling contact with such surface, on the one hand, or the discs 38, when the machine is performing a soil conditioning operation, will be engaged to a greater or lesser depth with the soil, on the one hand, a cam member 53 is pivoted, as at 53' to the tractor at a point just above the forward end of the supporting member 10, and has secured thereto the lower end of an upwardly directed lever arm 54, which, in turn, is pivotally connected, as at 55, to the forward end of an operating push and pull bar or rod 56. This bar or rod 56 declines rearwardly from the pivot connection 55, and is passed through a loop 57 carried on the outer side face of the upper end portion of a standard 58 rising from the tractor 1. Formed in the lower edge of the bar or rod 56 are a series of equi-distantly spaced notches 59, which are adapted to engage the lower horizontal portion of the loop 57 in any one of the several adjusted positions of the bar or rod 56. The rear end of the bar or rod 56 terminates at a point convenient for its manipulation from the seat of the operator of the tractor. The cam member 53 has connected to the same one end of a flexible element or chain 53" confined and guided between side flanges of the cam as shown in Figure 1, while the other end of the chain is connected to the forward end of the side bar or frame member 10, which acts to effect a raising of the forward end of the frame when desired or necessary.

In the operation of the harrow as thus constructed, arranged and mounted on a tractor, and when the tractor is traveling to and from a field of operation, the discs 38, of the harrow, will roll freely over the ground surface, and when the field of operation is reached and it is desired to begin to harrow the soil, the operator will push forwardly on the bar or rod 56, when the lever arm 54 will move forwardly toward a horizontal position with the result that the cam member 53 will be swung downwardly on its pivot 53' and into rolling contact on the upper face of the forward and upwardly inclined frame member 10 which will be forced downwardly, and, consequently, the harrow discs 38 will be correspondingly forced into the ground. The downward pressure of the cam on the bar 10 with the chain confined between the side flanges of the cam will prevent outward drag through the outward pull of the offset disks of the harrow unit. The depth of operation of the discs 38 will be varied according to soil conditions or the desires of the operator through the adjustable range of the several notches 59 on the push bar or rod 56. After a harrowing operation, and it is desired to disengage the harrow discs 38 from the soil, the bar or rod 56 will be pulled in a rearward direction by the operator, when the lever arm 54 will be swung upwardly and rearwardly toward normal position and the cam member 53 in a similar direction and out of engagement with the side bar or frame member 10. This upward movement of the cam member 53 acts to exert an upward pull on the flexible connector or chain 53", whereby the forward end of the side bar or frame member 10 will be raised to normal position and the harrow discs 38 withdrawn from engagement with the soil. When in raised position, the harrow discs 38 are usually disposed in rolling engagement only with the ground surface.

In ordinary farm use, as in harrowing an open field, the harrow may be positioned inwardly toward the tractor as determined by the inner limit of the slotway 42. Now, should it be desired to harrow soil beneath growing trees, etc., having low hanging boughs or limbs, the harrow can be readily positioned outwardly for a desired or necessary distance from the tractor 1, by loosening up on the nut 47 on the pivot 44, and freeing the connection of the member 49, from the frame member 25, when the harrow can be extended outwardly of the frame portions 18 and 25. When so extended, the nut 47 will be tightened, and the member 49 secured again to the frame member 25 by being engaged in a complemental aperture in the latter. In the event of it being necessary or desirable that the direction of cut by the discs be changed or reversed, this can be readily accomplished by again releasing the member 49 from the frame member 25 and swinging the harrow on the pivot 44, loosening up on its securing nut 47 for the purpose if it be required. When the desired angle of adjustment is made, the harrow will be secured in such position by a proper manipulation of the oppositely disposed securing nuts 51 and 52 on the member 49, after the latter has been re-engaged in a complemental opening in the member 25. As shown in Figure 5, with the harrow positioned inwardly toward the tractor 1, it can be swung on the pivot 44 to the angular position a—b, or reversed to a position c—d, while when moved to an outwardly extended position, it can be again adjusted angularly to the same positions as indicated at a'—b' or c'—d', or in either instance of such adjustment, the harrow may be moved to any angular adjustment between parallel relation with respect to the frame members 18 and 25, and the extremes indicated as above.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. An attachment for farm-type tractors comprising a supporting frame mounted on the tractor to extend longitudinally thereof between its frame and wheel and having a harrow mount thereon extending transversely outward from the tractor, a harrow unit attached to said mount, and means for adjusting said harrow unit at desired distances outwardly of said mount.

2. An attachment for farm type tractors comprising a supporting frame mounted on the tractor to extend longitudinally thereof between its frame and wheels and having a laterally extended portion, a harrow unit attached to said extended portion, and means for adjusting said harrow unit outwardly of the extended portion of said frame.

3. An attachment for farm type tractors comprising a supporting frame mounted on the tractor to extend longitudinally thereof and having its rear end attached to the tractor, a disk gang unit attached to and extending outwardly from said frame, means cooperating with the front end of said frame for varying the working depth of said unit, and means for varying the working relation of said unit angularly with respect to said frame.

4. An attachment for farm type tractors comprising a supporting frame mounted on and extending longitudinally of the tractor with its rear end attached to the tractor and having a laterally extended portion, a disk gang unit attached to the extended portion of said frame, means for moving the forward portion of said frame to vary the working depth of said unit, and means for varying the working relation of said unit angularly with respect to said frame.

5. An attachment for tractors comprising a supporting frame mounted on the tractor and attached thereto at its rear end only, a disk gang unit attached to said frame, means for raising and lowering the forward end of said frame whereby to vary the working depth of said unit, and means for varying the working relation of said unit angularly with respect to said frame.

6. An attachment for tractors comprising a supporting frame mounted on the tractor and attached thereto at its rear end only, a disk gang unit attached to said frame, means for raising and lowering the forward end of said frame whereby to vary the working depth of said unit, means for adjusting said unit outwardly of said frame, and means for varying the working relation of said unit angularly with respect to said frame.

7. An attachment for tractors comprising a supporting frame mounted on the tractor and attached thereto at its rear end only, a disk gang unit attached to said frame, means for raising and lowering the forward end of said frame whereby to vary the working depth of said unit, means for adjusting said unit outwardly of said frame, and means for varying the working relation of said unit angularly in reversed directions with respect to said frame.

LEVI CUMMINGS HESTER.